UNITED STATES PATENT OFFICE.

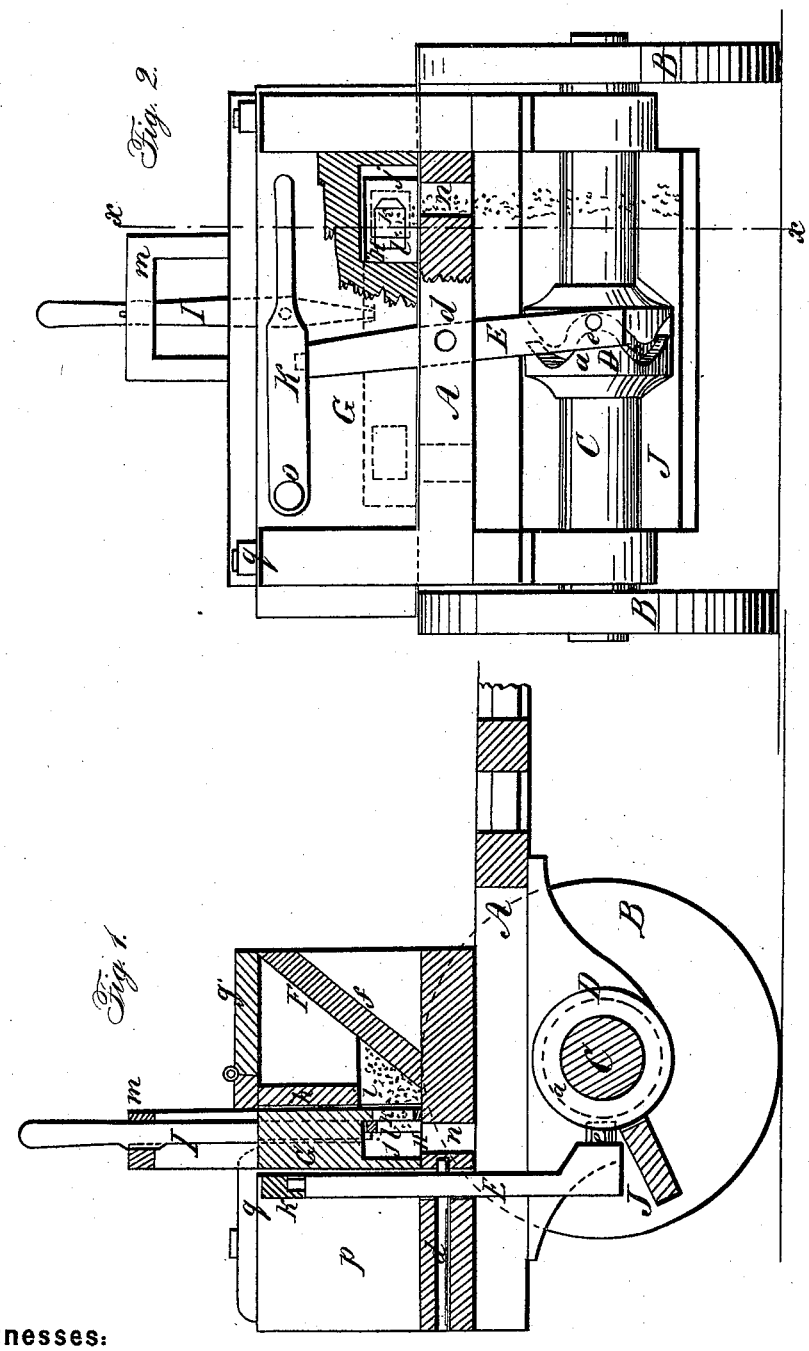

SAMUEL HENRY, OF CHENOA, ILLINOIS.

IMPROVEMENT IN SEEDING-MACHINES.

Specification forming part of Letters Patent No. 23,920, dated May 10, 1859.

*To all whom it may concern:*

Be it known that I, SAMUEL HENRY, of Chenoa, in the county of McLean and State of Illinois, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\,x$, Fig. 2; Fig. 2, a back view of the same.

Similar letters of reference indicate corresponding parts in the two figures.

The object of this invention is to obtain, by a very simple mechanism, a machine that will sow various kinds of seeds, either in drills or in a broadcast manner.

The invention consists in the employment or use of a reciprocating distributer in connection with an adjustable slide applied to a seed-box, and arranged substantially as hereinafter fully shown and described.

To enable those skilled in the art to fully understand and construct my invention, I will proceed to describe it.

A represents a horizontal frame, which is mounted on two wheels, B B, one of which is attached to its axle C, so that the axle may turn with it. The axle C has a cam, D, placed on it, said cam being formed of a hub or boss, $a$, having a zigzag or sinuous groove, $b$, formed in it circumferentially.

In the back part of the frame A a lever, E, is placed, the fulcrum-pin $d$ of which is in the frame A. The lower end of lever E is provided with a pin, $e$, which is fitted and works in the groove $b$.

On the frame A a seed-box, F, is placed, said box extending entirely across the frame A, having an inclined front piece, $f$, and a lid, $g$. The back $h$ of the seed-box does not extend quite down to its bottom. A space, $i$, is allowed, as shown plainly in Fig. 1.

At the back of the seed-box F a slide-bar, G, is placed. This slide-bar has two perforations or recesses, $jj$, made in its under side, one near each end, and within the slide-bar G a slide, H, is placed, said slide passing through the recesses $jj$. Each recess $j$ in the slide-bar G is made to communicate with the lower part of the seed-box F by means of openings $k$, and these openings may be constructed as desired by adjusting the slide H, which is provided with openings $l$, the latter, by the adjustment of the slide, being made to register more or less perfectly with the openings $k$ in the slide-bar G. The slide H is adjusted by means of a lever, I, which is fitted in the slide-bar G at about its center, and is connected at its lower end with the slide H. The upper part of lever I works in a slotted bar, $m$, and is retained at any desired point within the range of its movement by means of a pin fitting in notches in the bar $m$. In the platform A, and directly under each recess $j$ in the slide-bar G, an opening, $m$, is made.

J is a board, which is attached to the bearings of the axle C. This board is parallel with the axle C and adjoins it, and serves to scatter the seed as it falls on it from the openings $n$.

The upper end of lever E is fitted in a notch in a bar, K, which is attached to the back side of the slide-bar G by a pivot, $o$, and to the upper surfaces of uprights $p\,p$. On the frame A buttons $q\,q$ are placed to prevent the slide-bar G from casually rising. The seed-box F is provided with a series of partitions at its upper part to keep the seed level in box F.

The operation is as follows: As the machine is drawn along the cam D and lever E give a reciprocating movement to the slide-bar G, and the seed in the box F passes through the openings $k$ into the recesses $j\,j$, and from thence down through the openings $n\,n$ on the board J, which scatters it broadcast on the ground. The quantity of seed to be sown or planted on a given area of ground may be regulated by adjusting the slide H, thereby making the openings $k$ of the proper size to perform the desired work. The distributing of seed may be stopped at any time by merely raising the bar K, thereby disconnecting the lever E from the slide-bar G, the openings $k$ being closed by adjusting slide H. The implement may then be moved from place to place without operating the seed-distributing device. In case seed is to be sown in drills the board J is removed and the usual teeth or shares employed for forming the furrows and conveying the seed thereto. The slide-bar G, by its reciprocating movement, prevents any clogging or choking of the seed, for the seed is agitated within the recesses $j\ j$, and also within the lower part of the seed-box F, by the movement of the slide-bar G.

The whole device is extremely simple and efficient, not liable to get out of repair, and may be readily repaired when necessary by persons possessing but little ingenuity.

I do not claim any of the parts separately or in themselves considered; but

I do claim as new and desire to secure by Letters Patent—

The slide-bar or seed-distributer G, with slide H fitted therein and placed relatively with the seed-box F, as shown, the whole being combined and arranged to operate as and for the purpose set forth.

SAMUEL HENRY.

Witnesses:
GEO. M. BEDINGER,
R. C. SALLEE.